Patented Apr. 25, 1950

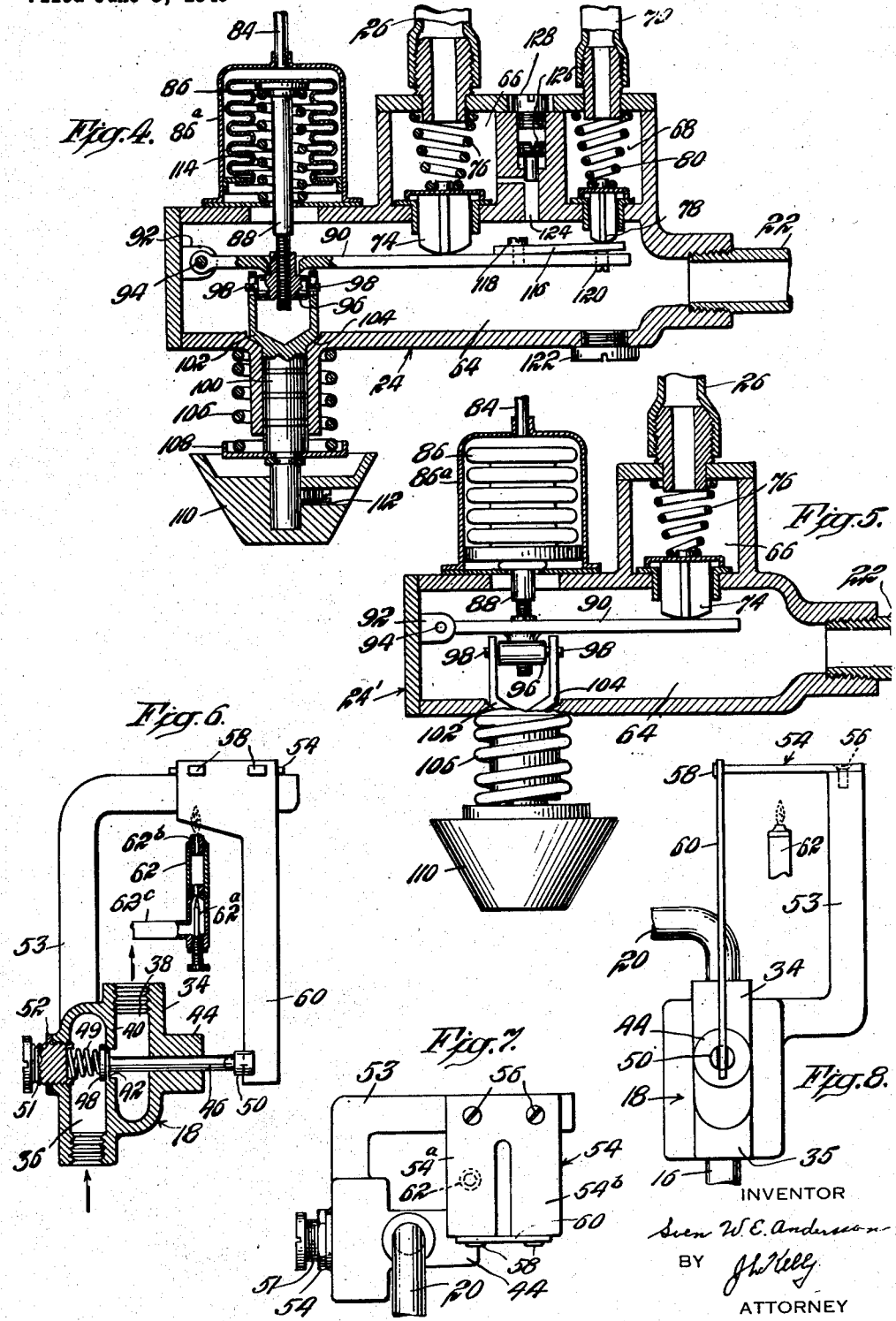

2,505,455

UNITED STATES PATENT OFFICE 2,505,455

GAS BURNER CONTROL

Sven W. E. Andersson, Evansville, Ind., assignor to Servel, Inc., New York, N. Y., a corporation of Delaware Application June 8, 1945, Serial No. 598,305

5 Claims. (Cl. 236—15)

My invention relates to thermostatic controls for gas burners and particularly to thermostatic controls for oven burners of domestic gas ranges.

The problem of thermostatically controlling relatively large gas flows has been frequently solved by employing electrically-operated gas valves regulated by electric thermostats. In some instances, the use of electricity is not desirable and in such instances the gas pressure is sometimes utilized to operate the main gas valve. Combinations of electric and pressure-operated controls have also been used. There are numerous reasons for resorting to such indirect control systems, one of the main reasons being the inability of most thermostatic elements to furnish sufficient mechanical energy for direct valve operation. There are cases where both electric and pressure-operated diaphragm valves are undesirable. A domestic gas oven control, for example, should not depend upon electric power and, since the temperature of all parts of a gas range is apt to become too hot for the use of large flow gas valves controlled by flexible diaphragms, pressure-operated diaphragm valves are undesirable. Furthermore, a thermostatic control for a gas range oven should be fast in action, and such a control should be free of influence by varying ambient temperatures even though such temperatures be relatively high.

I have invented an indirect system of control wherein only a small flow of gas is controlled by a standard primary thermostat. This gas is conducted to a small pilot burner which heats a bi-metal thermostatic element which, in turn, operates the main gas valve. The thermostatic valve mechanism, in other words, acts as a gas relay or servomotor. The relay or servomotor can be designed to move a large valve with ease and speed, or it may be used to build up energy to move the main gas valve with a snap action. Only a very small valve movement in the primary thermostatic control is required. A considerable improvement in sensitivity is, therefore, realized. My improved indirect system of control has particular utility when used in connection with a pilot-operated safety cutout for a gas burner and also when used for controlling dual preheat and maintaining burners for a gas range oven. The bi-metal thermostatic element is connected to the main gas valve actuating mechanism in such a manner that the actuating mechanism is not influenced by changes in ambient temperature.

The above and other objects and advantages of my invention are attained as set forth in the detailed specification, taken with the accompanying drawings, in which:

Fig. 4 is a horizontal sectional view through the primary thermostatic control 24 illustrated in Fig. 1;

Fig. 5 is a horizontal sectional view through the primary thermostatic control 24' illustrated in Figs. 2 and 3;

Fig. 6 is a front elevational view, partly in section, of a safety cutout valve or gas relay incorporating my invention;

Fig. 7 is a top plan view of the device illustrated in Fig. 6; and

Fig. 8 is a side elevational view of the device illustrated in Fig. 6.

Figure 1:
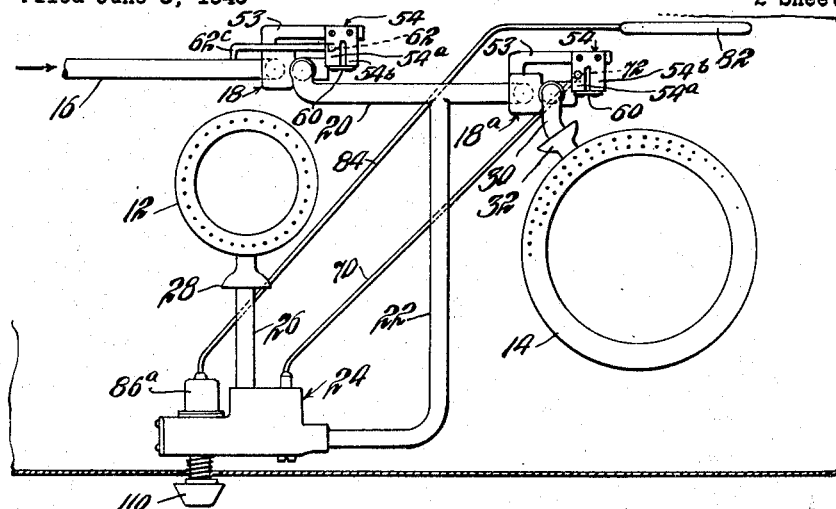
Fig. 1 is a diagrammatic top plan view of a domestic gas oven incorporating one embodiment of my invention.

Referring now particularly to Fig. 1 of the drawings, reference character 10 designates generally a gas range oven. This oven is provided with a relatively small maintaining burner 12 and a large preheat burner 14. A gas supply conduit 16 is connected to maintaining burner 12 by means of a safety cutout valve 18, a conduit 20, a branch conduit 22, a primary thermostatic control 24, a conduit 26 and a mixing tube 28. Branch conduit 22 is provided with a manually-operated gas cock, not shown. Preheat burner 14 is connected to conduit 20 by a thermostatically-operated valve or gas relay 18a, generally similar to safety cutout valve 18 and to be described in detail hereinafter, a branch conduit 30 and a mixing tube 32.

Referring now to Figs. 6–8 inclusive of the drawings, the safety cutout 18, which is described and claimed in my copending application Serial No. 591,573, filed May 2, 1945, consists of a gas valve body member 34. This valve body is provided with an inlet chamber 36 connected to the gas supply conduit 16 and an outlet chamber 38 having the conduit 20 connected thereto. A partition 40, having an opening therein and provided with a valve seat 42, separates inlet chamber 36 from outlet chamber 38. An integral boss 44 is provided on the valve body and is drilled to receive and guide a valve stem 46. One end of stem 46 is formed with a valve head 48 adapted to rest on the valve seat 42 to close the passage between inlet chamber 36 and outlet chamber 38. The opposite end of stem 46 is provided with a bifurcated or slotted element 50. A compression spring 49 biases valve 48 to its closed position and is adjusted by an adjusting plug 51. A lock nut 52 locks the adjusting plug in place. An inverted L-shaped arm 53 projects from the valve body 34 and forms a support for a bi-metal thermostatic element 54. Bi-metal element 54 is attached to the top portion of arm 53 by a pair of machine screws 56. As shown in Fig. 7, bi-metal element 54 consists of a single piece of bi-metal which is slotted to form two legs or prongs 54a and 54b each of which is provided at its free end with a tab 58. A lever 60 is loosely fastened at one end to the tabs 58 and at its opposite end this lever fits loosely within the slotted element 50 of valve stem 46. A pilot burner 62 is located directly beneath the prong 54a of the bi-metal element. Pilot burner 62 is provided with a manually-actuated needle valve 62a and a nozzle 62b. This pilot is connected to gas supply conduit 16 by a small conduit 62c, as shown in Fig. 1.

Referring again to Fig. 1 and to Fig. 4, the primary thermostatic control 24 includes a valve housing having an inlet chamber 64 connected to the branch conduit 22, an outlet chamber 66 having the conduit 26 connected thereto, and an outlet chamber 68 having a conduit 70 connected thereto for supplying gas to a pilot burner 72 of the gas relay 18a. A valve 74, biased toward closed position by a compression spring 76, controls the flow of gas from inlet chamber 64 to outlet chamber 66. A valve 78, biased toward closed position by a compression spring 80, controls the flow of gas from inlet chamber 64 to outlet chamber 68. Valves 74 and 78 are urged toward open position by a fluid thermostat including a thermal bulb 82, a capillary tube 84, an expansible-contractible bellows 86, a plunger 88 and a lever 90. As shown, lever 90 is pivotally connected to a bracket 92 by a pivot pin 94. Lever 90 is adjustably connected to plunger 88 by an adjusting nut 96 threaded on one end of the plunger and provided with a pair of ears 98. The ears 98 slidably engage in a pair of slots formed in the inner end of an adjusting stem 100. As shown, adjusting stem 100 is provided with a tapered portion 102 adapted to fit into a conical portion 104 formed in the housing to provide a gas-tight seal. Stem 100 is urged into sealing engagement with the housing by a compression spring 106 having one end bearing against the housing and its opposite end bearing against a collar 108 attached to the stem. A dial 110 provided with suitable indicia, not shown, is attached to the outer end of stem 100 by a set screw 112.

A compression spring 114 surrounds the plunger 88 and tends to force the plunger and the bellows 86 to respond to changes in volume of the fluid with which the thermostat is charged. This compression spring also tends to overcome valve springs 76 and 80. The thermal bulb 82, capillary tube 84 and the space between the bellows 86 and the bellows housing 86a are completely filled with an expansible liquid. Valve 78 is adjusted so that this valve closes before valve 74 starts to close. This is accomplished by attaching a leaf spring 116 to the lever 90, as by a machine screw 118, and by adjusting the position of this leaf spring relative to the lever 90 and the valve 78 by a set screw 120. Access may be had to set screw 120 by providing a removable plug 122 in the control housing. A bypass channel 124 is provided between inlet chamber 64 and outlet chamber 66. This channel, which provides a minimum flame for the maintaining burner 12, is provided with an adjusting screw 126 which is made accessible by a removable plug 128.

As stated above, the gas relay 18a is generally similar to the safety cutout valve 18 except that the safety cutout 18 is open or closed depending upon the presence or absence of a flame at the pilot 62. The gas relay 18a, on the other hand, may function as a modulating or throttle valve responsive to the intensity of the flame of pilot burner 72 which, in turn, is responsive to the temperature of the oven 10 as reflected by the thermal bulb 82. Or this gas relay may function as an on or off valve depending upon the presence or absence of a flame at the pilot 72 which, in turn, is dependent upon the temperature of the oven. Pilot 72 is provided with a manually-adjustable needle valve and with a nozzle, neither of which is shown but which are generally similar to the needle valve 62a and the nozzle 62b of the pilot 62, Fig. 6.

In operation, assume that constantly-burning pilot 62 is lighted and that fuel gas flows from conduit 16 through safety cutout valve 18, conduit 20, branch conduit 22 into inlet chamber 64 of the primary thermostatic control 24. With reference to Figs. 6–8 inclusive, the operation of this safety cutout is briefly that as long as pilot 62 is burning, the heat from this pilot heats the prong 54a of bi-metal element 54 causing this prong to bend upward. The prong 54b, on the other hand, is not appreciably affected by the heat of the pilot burner. Therefore, prong 54a is bent upward considerably more than prong 54b which causes the lower end of lever 60 to be swung to the left, thereby opening the valve. The valve will be held in open position so long as the pilot 62 is lighted. If, however, this pilot flame is extinguished, the temperature differential between prong 54a and prong 54b of the bi-metal element quickly disappears by heat conduction through the bi-metal element itself. This causes the free or movable end of prong 54a to bend downward relative to prong 54b swinging the lever 60 counter-clockwise whereupon compression spring 49 urges the valve toward closed position.

Dial 110 of the primary thermostatic control 24 is set at the desired oven temperature and the gas cock, not shown, in branch conduit 22 is opened, whereupon gas flows into the primary control. Gas flows from the inlet chamber 64 of primary control 24 through valve 74, outlet chamber 66, conduit 26 and mixing tube 28 to maintaining burner 12, where the gas is ignited, as by constantly-burning pilot 62. Gas also flows from inlet chamber 64 through valve 78, outlet chamber 68 and conduit 70 to the pilot 72 of gas relay 18a. In practice, maintaining burner 12 may be located within preheat burner 14 and the constantly-burning pilot 62 may be so located relative to these two burners and to pilot 72 that constantly-burning pilot 62 ignites the two burners and the pilot 72. Assume now that pilot 72 is lighted and that the heat of this pilot heats prong 54a of bi-metal element 54 without appreciably heating the other prong 54b. This causes the valve of gas relay 18a to be opened and gas flows from conduit 20 through this valve, through conduit 30 and mixing tube 32 into preheat burner 14. The amount that the valve of gas relay 18a is opened depends upon the intensity of the flame of pilot burner 72 which, in turn, is controlled by the temperature of the oven through the thermostatic control 24. Or, as stated above, this gas relay may be an on or off type depending upon the presence or absence of a flame at pilot 72.

As the oven approaches the temperature set by the dial 110, valve 78 is gradually closed, reducing the supply of gas to the pilot 72 which, in turn, causes the valve of gas relay 18a to reduce the amount of gas supplied to preheat burner 14 until valve 78 is closed and the flame at pilot 72 is extinguished, at which time the gas relay closes the supply of gas to preheat burner 14. However, as stated above, valve 78 is so adjusted that this valve is closed before valve 74 begins to close. Therefore, after valve 78 is closed, valve 74 remains open and supplies gas to maintaining burner 12 so long as the temperature of the oven is below the temperature set on the dial. In other words, once the oven has reached the desired temperature, valve 74 acts as a modulating valve to hold this temperature. If, however, the oven temperature should drop appreciably, as by opening the oven door, valve 78 again opens and supplies gas to pilot 72 which, in turn, causes relay 18a to open and supply gas to preheat burner 14. As stated above with reference to the operation of safety cutout 18, when pilot 72 of gas relay 18a is extinguished, or when the supply of gas to this pilot is of such intensity that prong 54a of the bimetal element is not appreciably heated, the temperature of prongs 54a and 54b is quickly equalized by heat conduction through the element itself, whereupon the valve of gas relay 18a is quickly closed even though the ambient temperature may be relatively high.

Figure 2:
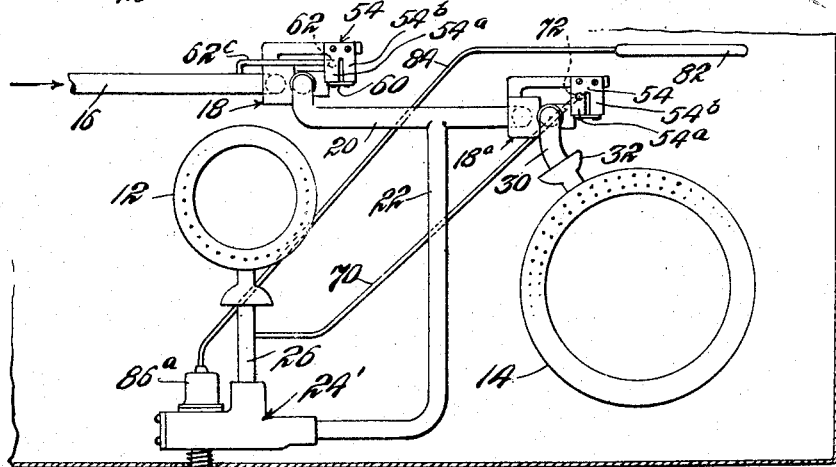
Fig. 2 is a digrammatic top plan view similar to Fig. 1, illustrating a second embodiment of my invention.

Referring now to Fig. 2 of the drawing, the arrangement of the safety cutout, the maintaining burner, the preheat burner and the gas relay for controlling the suply of gas to the preheat burner are generally similar to these same elements illustrated in Fig. 1. Therefore, like reference characters are used to designate like elements in these two figures. However, the primary thermostatic control 24' of Figs. 2 and 5 is different from the primary thermostatic control 24 of Figs. 1 and 4 in that the valve 78 of Fig. 4 has been eliminated from the control shown in Fig. 5 and the conduit 70 which supplies gas to the pilot 72 opens directly into the conduit 26 which supplies gas to maintaining burner 12.

The operation of the embodiment illustrated in Fig. 2 is generally similar to that illustrated in Fig. 1. That is, assuming that the constantly-burning pilot 62 is burning, gas flows from supply conduit 16 through safety cutout 18, conduit 20, branch conduit 22, inlet chamber 64 of thermostatic control 24' (Fig. 5) through valve 74, outlet chamber 66, conduit 26 and mixing tube 28 to maintaining burner 12. The pressure of the supply of gas to maintaining burner 12 controls the supply of gas to preheat burner 14. That is, when the oven is first lighted and the thermal bulb 82 is calling for heat, valve 74 is opened appreciably and the pressure of gas in conduit 26 is relatively high. Gas flows from conduit 26 through conduit 70 to pilot 72, where it is ignited as before. The heat of the pilot 72 opens gas relay 18a and supplies gas to preheat burner 14. As the oven is brought up to the desired temperature, valve 74 gradually closes, reducing the gas pressure in conduit 26 which, in turn, reduces the supply of gas through conduit 70 to pilot 72 until the intensity of the flame at this pilot is no longer sufficient to hold the gas relay 18a open.

The gas relay of Fig. 2 is so designed that a critical adjustment may be made thereto so that this relay will both open and close while the gas pressure in conduit 26 is relatively high. By such an arrangement, once the oven has been brought to the desired temperature, the supply of gas to the preheat burner 14 is cut off, even though gas continues to be supplied to the maintaining burner 12 at a moderately high pressure. This is accomplished by adjusting the needle valve of pilot 72, not shown, but generally similar to the needle valve 62a of pilot 62, and by so designing the nozzle of pilot 72 that the flame will have a tendency to stay close to the nozzle at moderate gas pressure, but the flame will shoot out and impinge upon prong 54a of the bi-metal element 54 at high pressure.

Figure 3:
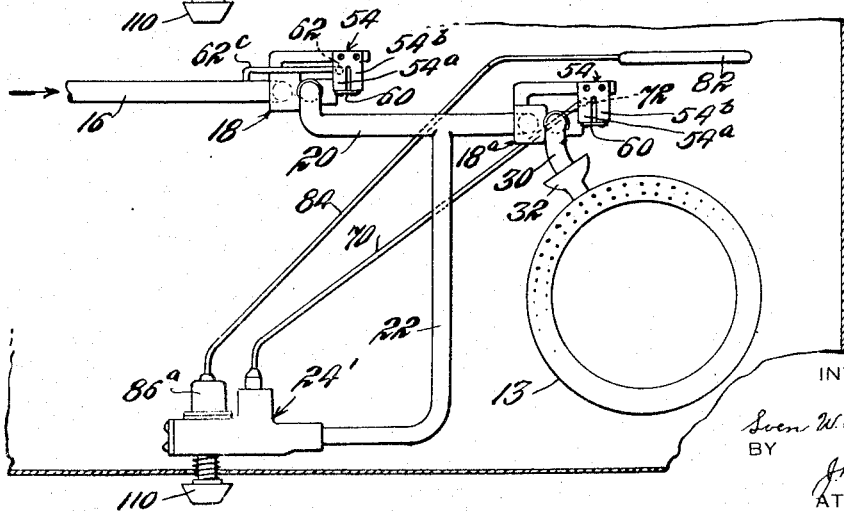
Fig. 3 is a digrammatic top plan view similar to Fig. 1, illustrating a third embodiment of my invention.

In Fig. 3 of the drawing wherein a third embodiment of my invention is illustrated, like reference characters are again used to represent elements that are similar to those illustrated in Figs. 1 and 2. In this embodiment a single oven burner 13 is controlled by a primary thermostat through the intermediary of a pilot-operated gas relay. In the operation of this embodiment, gas flows from supply conduit 16 through safety cutout 18—assuming that constantly-burning pilot 62 is ignited—conduit 20, branch conduit 22 to primary thermostatic control 24'. From the control 24', instead of the gas flowing from outlet chamber 66 (Fig. 5) to conduit 26 and from there to conduit 70, as in Fig. 2, the gas flows directly from outlet chamber 66 through conduit 70 to pilot 72. The gas relay 18a used with this embodiment is of the modulating type rather than of the on and off type. In other words, the pilot is so located relative to the bi-metal element 54 that the prong 54a of this bi-metal element bends upward in direct proportion to the intensity of the pilot flame; the intensity of the pilot flame being controlled by the valve 74.

While I have illustrated and described specific embodiments of my invention, it obviously may take other forms and be variously applied within the scope of the following claims.

What is claimed is:

1. A gas range including an oven, a preheat burner and a maintaining burner for heating said oven, means for supplying gas to each of said burners, said means including a gas supply conduit, a control valve in said gas supply conduit for controlling the supply of gas to said preheat burner, a thermostat for actuating said control valve, a pilot burner for heating a portion of said thermostat, a thermostatic valve for controlling the supply of gas from said supply conduit to said maintaining burner and said pilot burner responsive to the temperature of said oven, and means for adjusting said thermostatic valve whereby gas is supplied to said maintaining burner, said pilot burner and said preheat burner during a preheat period of operation of said oven and whereby gas is supplied only to said maintaining burner after said oven has reached a predetermined high temperature.

2. In a temperature control system, a first burner, a second burner, a pilot burner, a first thermostatic control including a housing having an inlet and two outlets, a valve in each of said outlets, a first conduit connecting one of said outlets to said second burner, a second conduit connecting the other of said outlets to said pilot burner, means for adjusting said valves whereby one of said valves closes at a predetermined temperature and the other of said valves modulates a supply of gas to said second burner to hold said predetermined temperature, and a second thermostatic control operable responsive to the flame of said pilot burner for controlling a supply of gas to said first burner.

3. In a temperature control system, a first burner, a pilot burner, a first thermostatic control including means for controlling a supply of gas to said pilot burner, a second thermostatic control for controlling a supply of gas to said first burner, said second thermostatic control including a valve, a bi-metal element having two prongs one of which is adapted to be heated by said pilot burner without appreciably heating the other of said prongs, and an actuating mechanism operatively connecting the prongs of said bi-metal element to said valve, said actuating mechanism being connected at one end to the prongs of said bi-metal element and having the opposite end thereof free to move in different paths relative to said valve, the construction and arrangement of said second thermostatic control being such that said valve is operated responsive to the intensity of the flame of said pilot burner whereas ambient temperature changes have no influence on the control of said valve.

4. In a temperature control system, a first burner, a second burner, a pilot burner, a first thermostatic control including means for controlling a supply of gas to said second burner and to said pilot burner, a second thermostatic control for controlling a supply of gas to said first burner, said second thermostatic control including a valve, a bi-metal element having two prongs one of which is adapted to be heated by said pilot burner without appreciably heating the other of said prongs, and an actuating mechanism operatively connecting the prongs of said bi-metal element to said valve, said actuating mechanism being pivotally connected at one end to the prongs of said bi-metal element and having the opposite end thereof in sliding contact with and free to move in different paths relative to said valve, the construction and arrangement of said second thermostatic control being such that said valve is operated responsive to the intensity of the flame of said pilot burner whereas ambient temperature changes have no influence on the control of said valve.

5. In a temperature control system, a first burner, a second burner, a pilot burner, a first thermostatic control including a housing having an inlet and two outlets, a valve in each of said outlets, a first conduit connecting one of said outlets to said second burner, a second conduit connecting the other of said outlets to said pilot burner, means for adjusting said valves whereby one of said valves closes at a predetermined temperature and the other of said valves modulates a supply of gas to said second burner to hold said predetermined temperature, a second thermostatic control for controlling a supply of gas to said first burner, said second thermostatic control including a valve, a bi-metal element having two prongs one of which is adapted to be heated by said pilot burner without appreciably heating the other of said prongs, and an actuating mechanism operatively connecting the prongs of said bi-metal element to said valve, said actuating mechanism being connected at one end to the prongs of said bi-metal element and having the opposite end thereof in contact with but free to move in different paths relative to said valve, the construction and arrangement of said second thermostatic control being such that said last-mentioned valve is operated responsive to the intensity of the flame of said pilot burner whereas ambient temperature changes have no influence on the control of said last-mentioned valve.

SVEN W. E. ANDERSSON.

REFERENCES CITED

The following references are of record in the file of this patent:

UNITED STATES PATENTS

| Number | Name | Date |
| --- | --- | --- |
| 424,617 | Powers | Apr. 1, 1890 |
| 470,653 | Bell | Mar. 15, 1892 |
| 1,819,560 | Klees | Aug. 18, 1931 |
| 1,842,335 | TePas | Jan. 19, 1932 |
| 1,977,216 | Unger | Oct. 16, 1934 |
| 2,015,289 | Royce | Sept. 24, 1935 |
| 2,144,121 | Parks | Jan. 17, 1939 |
| 2,200,187 | Nelson | May 7, 1940 |
| 2,227,901 | Hageman | Jan. 7, 1941 |
| 2,308,555 | Tate | Jan. 19, 1943 |
| 2,372,307 | Alexander | Mar. 27, 1945 |